(12) United States Patent
Vinciguerra et al.

(10) Patent No.: US 9,123,112 B2
(45) Date of Patent: Sep. 1, 2015

(54) METHOD FOR THE PRE-PROCESSING OF A THREE-DIMENSIONAL IMAGE OF THE SURFACE OF A TYRE FOR USE IN THE INSPECTION OF SAID SURFACE

(75) Inventors: Régis Vinciguerra, Clermont-Ferrand (FR); Steve Bourgeois, Clermont-Ferrand (FR); Alexandre Joly, Clermont-Ferrand (FR)

(73) Assignees: COMPAGNIE GENERALE DES ESTABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 132 days.

(21) Appl. No.: 13/881,781

(22) PCT Filed: Oct. 20, 2011

(86) PCT No.: PCT/EP2011/068314
§ 371 (c)(1),
(2), (4) Date: Jun. 24, 2013

(87) PCT Pub. No.: WO2012/055748
PCT Pub. Date: May 3, 2012

(65) Prior Publication Data
US 2013/0266225 A1   Oct. 10, 2013

(30) Foreign Application Priority Data
Oct. 27, 2010 (FR) ..................................... 10 58823

(51) Int. Cl.
*G06K 9/00* (2006.01)
*G06T 3/00* (2006.01)
(Continued)

(52) U.S. Cl.
CPC ............ *G06T 3/0056* (2013.01); *G06K 9/6204* (2013.01); *G06K 9/6206* (2013.01);
(Continued)

(58) Field of Classification Search
CPC .. G06K 9/6204; G06K 9/6206; G06T 3/0068; G06T 3/0056; G06T 7/003; G06T 2207/10028; G06T 2207/20116; G06T 2207/30108; G06T 2207/20016
USPC .................................................. 382/141–152
See application file for complete search history.

(56) References Cited

U.S. PATENT DOCUMENTS

| 5,715,166 A | 2/1998 | Besl et al. ................. 364/474.24 |
| 2008/0015763 A1* | 1/2008 | Kitazaki et al. ................. 701/70 |

(Continued)

FOREIGN PATENT DOCUMENTS

| EP | 1 750 089 A1 | 2/2007 |
| WO | WO 2009/077539 A2 | 6/2009 |

OTHER PUBLICATIONS

Z. Xie et al., "Image Registration Using Hierarchical B-Splines," IEEE Transactions on Visualization and Computer Graphics, vol. 10, No. 1, Jan. 2004, pp. 85-94.

(Continued)

*Primary Examiner* — Brian Le
(74) *Attorney, Agent, or Firm* — Fitzpatrick, Cella, Harper & Scinto (57) ABSTRACT

A method for inspecting a portion of a tire surface involves comparison with an image of a three-dimensional ("3D") reference surface. The method includes: extracting contours of graphic elements of an image of a 3D profile of a surface to be inspected; transforming the reference surface by establishing a correspondence between the contours of the graphic elements of the surface to be inspected and contours of identical graphic elements of the reference surface using a series of transformations; associating a B-spline surface, which includes control points, with the graphic elements of the transformed reference surface; and deforming the contours of the graphic elements of the reference surface by modifying positions of the control points of the B- spline surface so as to minimize distances between the contours of the graphic elements of the reference surface and the contours of the graphic elements of the surface to be inspected corresponding thereto.

11 Claims, 5 Drawing Sheets

(51) Int. Cl.
*G06K 9/62* (2006.01)
*G06T 7/00* (2006.01)

(52) U.S. Cl.
CPC .............. *G06T3/0068* (2013.01); *G06T 7/003* (2013.01); *G06T 2207/10028* (2013.01); *G06T 2207/20016* (2013.01); *G06T 2207/20116* (2013.01); *G06T 2207/30108* (2013.01)

(56) References Cited

U.S. PATENT DOCUMENTS

2009/0043517 A1* 2/2009 Matsuda et al. ............... 702/41
2011/0019903 A1  1/2011 Joly et al. ..................... 382/141

OTHER PUBLICATIONS

D. Rueckert et al., Nonrigid Registration Using Free-Form Deformations: Application to Breast MR Images,: IEEE Transactions on Medical Imaging, vol. 18, No. 8, Aug. 1999, pp. 712-721.

X. Huang et al., "Shape Registration in Implicit Spaces Using Information Theory and Free Form Deformations", IEEE Transactions on Pattern Analysis and Machine Intelligence, vol. 28, No. 8, Aug. 2006, pp. 1303-1318.

S. Belongie et al., "Matching Shapes," Proceedings of the Eighth IEEE International Conference on Computer Vision [(ICCV) Vancourver, British Columbia, Canada, Jul. 7-14, 2001], vol. 1, Jul. 2001, pp. 454,461.

J.A. Schnabel et al., "A Generic Framework for Non-rigid Registration Based on Non-uniform Multi-level Free-Form Deformations," MICCAI2001, LNCS2208, 2001, pp. 573-581.

M. Fornefett et al., "Elastic Medical Image Registration Using Surface Landmarks With Automatic Finding of Correspondences," Proc. Workshop Bildverarbeitung Für Die Medizin [(BVM 2000) Munich, Germany], Mar. 2000, pp. 48-52.

G. Borgefors, "Hierarchical Chamfer Matching: A Parametric Edge Matching Algorithm," IEEE Transactions on Pattern Analysis and Machine Intelligence, vol. 10, No. 6, Nov. 1988, pp. 849-865.

H.G. Barrow, J.M. Tenenbaum, R.C. Bolles, and H.C. Wolf, "Parametric Correspondence and Chamfer Matching: Two New Techniques for Image Matching," IJCAI'77 Proceedings of the $5^{th}$ International Joint Conference on Artificial Intelligence, vol. 2, Morgan Kaufmann Publishers, pp. 659-663 (1977).

L. Piegl and W. Tiller, *The Nurbs Book*, 2nd ed., chapter 2: "B-Spline Basis Functions," and chapter 3: B-Spline Curves and Surfaces, Springer, pp. 47-116 (1997).

R. Deriche, "Using Canny's Criteria to Derive a Recursively Implemented Optimal Edge Detector," International Journal of Computer Vision, vol. 1, pp. 167-187 (Apr. 1987).

C.F. Olson and D.P. Huttenlocher, "Automatic Target Recognition by Matching Oriented Edge Pixels," IEEE Transactions on Image Processing, vol. 6, No. 1, pp. 103-113 (Jan. 1997).

W.F. Press, S.A. Teukolsky, W.T. Vettering, and B.P. Flannery, *Numerical Recipes in C*, chapter 15.5: "Nonlinear Models," Cambridge University Press, pp. 681-688 (1992).

E. Catmull, and J. Clark, "Recursively generated B-splines surfaces on arbitrary topological surfaces," Computer-Aided Design, vol. 10, No. 6, pp. 350-355 (Nov. 1978).

* cited by examiner

METHOD FOR THE PRE-PROCESSING OF A THREE-DIMENSIONAL IMAGE OF THE SURFACE OF A TYRE FOR USE IN THE INSPECTION OF SAID SURFACE

FIELD OF THE INVENTION

The invention relates to the field of tyre manufacture. More particularly, the present invention concerns the problem of visual inspection of tyres during or at the end of the production process for the purpose of determining whether they conform to the control references established for the purpose of the use of which the said tyre will be made.

BACKGROUND

The methods employed for carrying out these processings usually consist in comparing a two- or three-dimensional image of the surface of the tyre to be inspected with a reference image in two or three dimensions of the surface of the said tyre. The general principle of these methods consists in establishing a correspondence between the image or the surface of the tyre to be inspected and the image or the reference surface, for example by superposing them, in order to determine the moulding anomalies by analyzing the differences between the two images or the two surfaces.

In the case of the tyre, the reference image of the surface may come for example from the digital data originating from the design of the tyre or, more commonly, from the digital data used to describe and to manufacture the curing mould, the said mould itself being designed to give its definitive shape to the said tyre.

The three-dimensional image of the surface of the tyre may be obtained, in a known manner, with the aid of an acquisition system capable of determining the three-dimensional relief of the tyre surface.

Matching the reference surface and the surface of the tyre to be evaluated uses methods which must be adapted to the particular case of this type of object.

Therefore, as an example, publication U.S. Pat. No. 5,715,166 describes the transformations to be made to match a reference surface with a three-dimensional image of a given object by using transformation functions such as rotations or slidings. This method is applied with good results when it is sought to match non-deformable solid objects such as metal parts, in this instance considered to be infinitely rigid. It does not apply to the tyre situation because of the deformable nature of this product.

Publication EP 1 750 089, which relates more specifically to an application designed for the inspection of tyres, proposes to divide the surface to be inspected and the reference surface into surface portions of reduced dimensions, corresponding substantially to the surface of a marking element such as a letter or a set of letters, and then sliding the said surface portions of the reference surface and of the surface to be inspected one over the other, so as to determine the optimum match between the contours of the reliefs of the two surface portions. After having carried out this local reset, the two surface portions are compared with one another in order to determine, in the zone corresponding to the surface portion, the degree of conformity of the tyre to be inspected relative to a reference.

Although the algorithms described in this publication have the advantage of dispensing, to a certain degree, with the positional differences between the model and the real tyre to be evaluated, and with the differences in fitting and inflation from one casing to another, they are close to those described in publication U.S. Pat. No. 5,715,166 in that they still assimilate the surface portions with rigid elements.

Specifically, it is observed that the tyre coming out of the mould does not exactly match the negative image of the mould in which the moulding and curing operation has been carried out, because of the elastic nature of the materials that make it up. The tyre deforms as soon as it comes out of the curing press under the action of the thermal retractions of the materials when cooling. Moreover, when fitted and inflated, the reinforcing plies take their final position and the curve of equilibrium of the inflated tyre does not necessarily match the curvature of the curing mould.

Also, it is found to be necessary to make a very precise prior adjustment of the image of the reference surface and of the acquired image of the surface of the tyre to be inspected in order to match the two surfaces for the purpose of obtaining therefrom pertinent information on the conformity of the tyre resulting from the production.

The method described in publication WO2009077539 proposes, in order to achieve this objective, to make affine transformations of the reference surface, of which the coefficient is different from 1, so as to have it coincide with the surface to be inspected, which is the equivalent of carrying out a variable elastic deformation in a particular direction of the said surface, and thereby distinct from a simple variation of scale.

It is however observed that this method does not make it possible to make the fine adjustments necessary to the perfect superposition of the surfaces and may induce incorrect judgements during the comparison of the surface to be inspected and the reference surface.

BRIEF DESCRIPTION OF THE INVENTION

Therefore, it is necessary to carry out one or more additional steps in order to refine the superposition of the surfaces. The object of the invention is to propose a method making it possible to superpose very precisely the reference surface and the surface to be inspected and accordingly forms an enhancement of the methods described in publications EP 1 750 089 or WO2009077539 cited above.

The method according to the invention is designed for the inspection of a portion of the surface of a tyre by comparison with a three-dimensional reference surface, the said surfaces comprising markings in relief, and comprises the steps during which:

the three-dimensional profile of the surface to be inspected is determined,
the contours of the graphic elements are extracted,
with the aid of a first series of transformations, a correspondence between the contours of the graphic elements of the surface to be inspected and the contours of the identical graphic elements of the reference surface is established.

This method is characterised in that, after having carried out this first series of transformations:

an elementary B-spline surface comprising a first set of control points is associated with each graphic element of the transformed reference surface, and
a first deformation of the contour of each graphic element of the reference surface is carried out by modifying the position of the control points of the elementary B-spline surface so as to minimise the distances between the contour of the graphic element of the reference surface and the contour of the graphic element of the surface to be inspected.

"B-spline surfaces" mean the spline surfaces developed around the works of Pierre Bézier and Paul de Casteljau, and as explained in terms of their principles in the work of G. Demengel and J P Pouget "Modèles de Bézier, des B-splines et des NURBS" (Bézier, B-Splines and NURBS models) published by Ellipses, or else in the publication of L. Piegl and W. Tiller, *The Nurbs Book* $2^{nd}$ ed., Springer, Chap. 2-3. Also, by extension, a B-spline surface in the context of the present description means all the surfaces parameterised with the aid of control points such as the NURBS (Non Uniform Rational Basis Splines) surfaces, the T-spline surfaces etc.

The use of B-spline surfaces to locally deform the contours of the graphic element makes it possible to refine the matching of the graphic elements of the surface to be inspected with the graphic elements of the reference surface for the purpose of minimising the errors of judgement when comparing by difference the surface to be inspected with the reference surface.

Preferably, to reduce the calculation time, it is advisable, prior to the first series of transformations, to flatten out the radial profile of the surface to be inspected and of the reference surface.

In order also to reduce the processing of the data originating from the means for digitising the surface to be inspected, it is also possible, prior to the first series of transformations, to convert the polar coordinates expressed relative to the rotational axis of the tyre of the image of the surface to be inspected and of the reference surface, into Cartesian coordinates.

Also to reduce the bulk of the calculation operations, during a step which precedes the first series of transformations, it is possible usefully to transform the data relating to the relief of each of the three-dimensional images to grey level so as to obtain the images in two dimensions of the surface to be inspected and of the reference surface.

In this way, the digital processings are carried out in a two-dimensional space and the calculations are reduced accordingly.

The choice of the method for carrying out the first series of transformations for the purpose of locating the graphic elements that are present on the surface to be inspected can make use of known or novel techniques while not losing sight of the fact that this first step is made necessary by the need to ensure, prior to the deformation of the contour of a graphic element, that the contours that it is sought to match as finely as possible are identical, namely that they originate from the same graphic element of the mould used to produce the tyre. Therefore, as a general rule, in order to make this association easier, the reference surface is obtained based on the digital information used to produce the mould itself.

A first method allowing this matching consists in using the possibilities provided by the B-spline surfaces themselves and comprises the steps during which:
  the characteristic points on the surface to be inspected are located and these points are paired with the corresponding characteristic points of the reference surface so as to create a set of couples of paired points,
  a reset B-spline surface is associated with the reference surface by assimilating the characteristic points of this surface to the control points of the said reset B-spline surface,
  the reference surface is deformed by moving the control points of the reset B-spline surface so as to superpose them on the characteristic points of the surface to be inspected with which they are paired.

This method is however to be handled with care because it requires carefully choosing the characteristic points so as to prevent improper deformations of the reference surface.

Also alternatively, it is possible favourably to use the method described in publication WO2009077539, in which the first series of transformations comprises the steps during which:
  characteristic points are located on the surface to be inspected and these points are paired with the corresponding characteristic points from the three-dimensional data of the reference surface so as to create a set of paired couples of characteristic points,
  an affine transformation function applied to the characteristic points of the reference surface is sought iteratively so that the value representing the total of the distances between each of the characteristic points of the reference surface, transformed with the aid of the said first affine transformation function, and the points of the surface to be inspected that are paired therewith is minimal,
  the set of points of the reference surface is transformed with the aid of the said affine transformation function.

Preferably, the affine function used for the series of transformations comprises a change of scale of which the ratio has an absolute value different from 1.

It is also possible to use, for the first series of transformations, the method described in publication EP 1 750 089 in which:
  the three-dimensional data of the reference surface are transformed with the aid of a scale factor in order to adjust the dimension of the reference image to that of the surface to be inspected,
  the reference image and the image of the surface to be inspected are divided into surface elements of reduced size comprising one or more graphic elements,
  a coincidence between the graphic elements contained in these surface elements is established.

Once the first deformation of the contours of the graphic elements of the reference surface has been carried out with the aid of the elementary B-spline surfaces, it is possible for reset differences to subsist. In this case, it is possible to carry out a yet finer reset which is designed to subdivide the said elementary B-spline surface by increasing the number of control points so as to associate a second set of control points with each subdivided graphic element of the reference surface originating from the first B-spline deformation.

In order to reduce the calculation time, it is possible with benefit to carry out this subdivision around the only control points of the first set which influence a point of the contour of the reference surface that is incorrectly reset after the first deformation.

A second deformation of the contour of the graphic element of the reference surface is then carried out by modifying the position of the control points of the subdivided B-spline surface so as to minimise the distances between the contour of the subdivided graphic element of the reference surface and the contour of the subdivided graphic element of the surface to be inspected.

The inspection method according to the invention then provides for assessing the conformity of the zone to be inspected by comparing the digital data describing the surface to be inspected with the digital data describing the reference surface modified with the aid of the first series of transformations, and of the first and, as the case may be, of the second B-spline deformation.

The invention also relates to a device for inspecting the surface of a tyre which comprises means making it possible to determine the three-dimensional profile of the surface to be inspected, means for storing the digital data describing the reference surface, and computer calculating means capable of applying the calculation algorithms comprising the steps in which:

the three-dimensional profile of the surface to be inspected is determined, the contours of the graphic elements are extracted, with the aid of a first series of transformations, a correspondence between the contours of the graphic elements of the surface to be inspected and the contours of the identical graphic elements of the reference surface is established, then an elementary B-spline surface comprising a first set of control points is associated with each graphic element of the transformed reference surface, and a first deformation of the contour of each graphic element of the reference surface is carried out by modifying the position of the control points of the elementary B-spline surface so as to minimise the distances between the contour of the graphic element of the reference surface and the contour of the graphic element corresponding thereto of the surface to be inspected.

BRIEF DESCRIPTION OF THE DRAWINGS

The purpose of the following description is to give the details of the main steps of the implementation of the method according to the invention based on the figures and explanatory diagrams 1 to 9 in which.

DETAILED DESCRIPTION OF THE INVENTION

The inspection method according to the invention relates to the portions of the surface of a tyre that comprise markings in relief. "Markings in relief" means the elements such as numbers or alphanumeric characters, sequences of characters forming words or numbers, figurative characters such as ideograms of the decorative patterns or of the drawings, grooves, situated on the sidewall or on the inner surface, or else sculpture patterns of the tread.

In a known manner, the user thus seeks to obtain the data making it possible to characterise the three-dimensional surface of the surface to be inspected. In order to carry out this operation, the surface is lit with the aid of a white light or of a light with a given wavelength formed by the light originating from a laser beam, and the light reflected by the surface is captured with the aid of an acquisition means such as a matrix camera. It is also possible to use a laser triangulation, three-dimensional sensor of which the principles can be assimilated, in two dimensions, to those of a linear camera.

The tyre to be inspected is installed on a means making it possible to set it to rotate relative to the acquisition system. By making the tyre carry out a complete revolution around its rotation axis relative to the acquisition system, the digital data are obtained which, after processing by an appropriate and known calculation means, are representative of the three-dimensional coordinates of the surface to be inspected which is then materialised by a set of points in a three-dimensional space.

The exemplary embodiment of the invention described below relates more particularly to the inspection of the sidewalls of the tyre which are usually filled with markings and with graphic patterns of all kinds. However, the techniques used may, providing there is transposition, be used in an identical manner for the inspection of the inner portion or of the tread.

The surface used as a reference may originate from the three-dimensional design data of the tyre or, preferably, from the data for the design and production of the curing mould and more specifically from the data used to etch the shells used to mould the sidewalls and bearing the hollowed markings.

As has been mentioned above, it is worthwhile for an effective implementation of the method, to simplify the calculations to be made by carrying out several prior simplification steps.

It is possible for example to appropriately choose the coordinate systems in which the three-dimensional coordinates of the points of the reference surface and of the surface to be inspected will be expressed, so as to allow simple projections making it possible to reduce the number of dimensions of the space to be studied.

Also, it is arranged that the coordinates in three dimensions x, y, z of the surfaces to be analysed are expressed in an OX, OY, OZ rectangular coordinate system in which the axis OZ is substantially indistinguishable from the rotation axis of the tyre.

Figure 1:
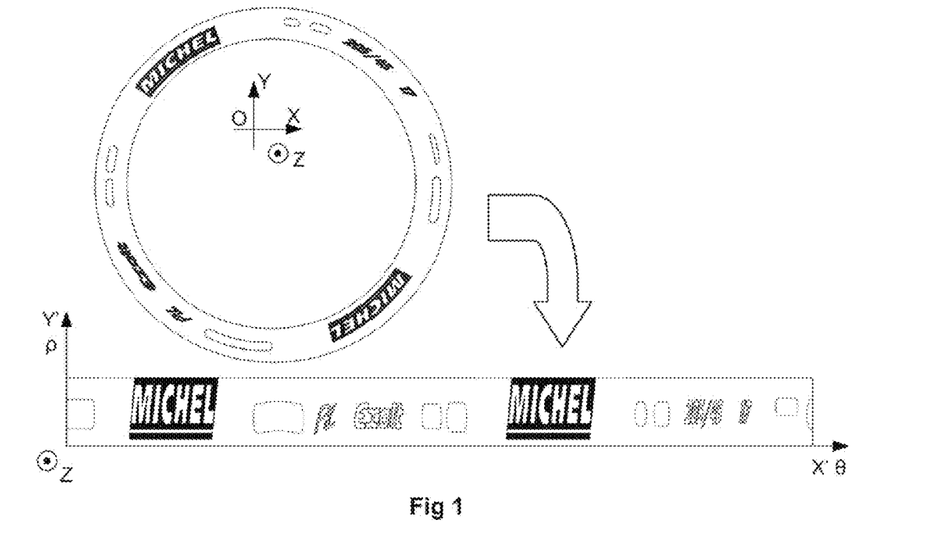
FIG. 1 represents the 2D image of the contours of the elements in relief of a reference surface and of the opened-out image of this image.

It is then possible to convert the polar coordinates of type $\rho$, $\theta$ of the surface to be inspected and of the reference surface into Cartesian coordinates relative to the axes OX and OY, which consists in opening out the surface as illustrated in FIG. 1. For this it is sufficient to consider that the value of $\rho$ corresponds to the value along an axis OY' and that the value $\theta$ corresponds to the coordinate along the axis OX'. The coordinate system OX'Y' itself being a rectangular coordinate system.

Figure 2:
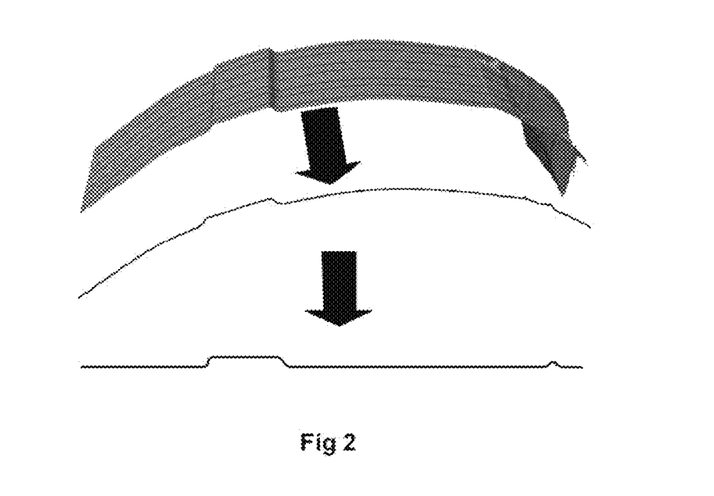
FIG. 2 represents an illustration of the steps for determining the flattened-out profile.

Another simplification consists in flattening out the three-dimensional surface. Accordingly, the mean profile of the curve of the surface should be determined in a radial plane. All of the points in the plane formed by the axes OZ and OX' are projected, as illustrated in FIG. 2, which corresponds to a projection in a radial plane. The shape of the mean radial profile will be given by the shape of the cloud of points in this radial plane, from which it is possible to extract a mean curve by taking the mean of the values in a direction OZ. The surface obtained by again opening out this mean radial profile corresponds substantially to the surface of the tyre on which no relief marking would appear.

It is then sufficient, for each value of the angle $\theta$, to subtract the value of this mean radial profile from the coordinates expressed in the plane OX'Z to obtain a flattening out of the opened-out surface determined above, and in which only the elements in relief have a value along the axis OZ.

The flattening out may also be carried out by following the profile of the surface along a determined course, for example a radial line, by detecting the localised variations of the profile signifying the relief markings made on the said surface. It is then sufficient, after having applied a filter to eliminate the abnormal variations and the slow variations associated with the only variation in curvature, to reproduce these variations on a flat surface on which only the elements in relief corresponding to the markings appear.

Also to simplify the calculations, it is possible to assign a grey-level value to the value along the axis OZ. This then gives a two-dimensional image of the surface on which the elements in relief are detached visually relative to the colour of the mean surface. The intensity of the grey level is proportional to the elevation of the point relative to the mean relief of the surface. The latter simplification can be carried out with a similar result on the flattened-out surface according to one of the methods explained above.

Figures 3, 4:
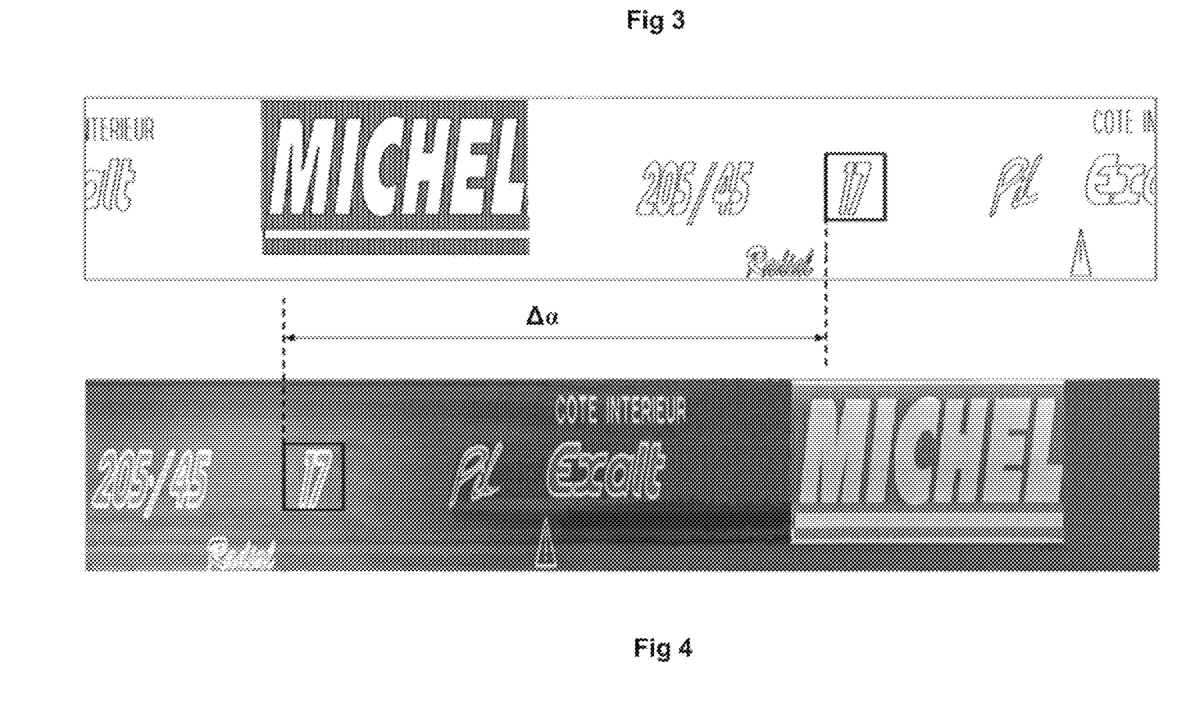
FIGS. 3 and 4 illustrate the steps of azimuth reset.

FIG. 3 illustrates the result of these simplifications which are more particularly adapted to the processing of the sidewall of the tyre and applied to the reference surface flattened out that has been opened out, and converted into a grey-level image. FIG. 4, for its part, represents the image opened out and flattened out of the surface to be inspected.

It is also possible to reset the image of the reference surface relative to the image of the surface to be inspected. Accordingly, a collection of alphanumeric characters or of patterns which are present only once on the surface is predetermined as illustrated in FIGS. 3 and 4. When these characters have been located in the two images, the angular difference $\Delta\alpha$ is assessed between these two characters or series of characters and a change of coordinates is carried out on the axis OX' (representing the angular values $\theta$), by having the origin of these angular values passed through by these characters.

Once these simplifications are complete, the map of the contours of each graphic element present on the reference surface and on the surface to be inspected is produced. The conventional Deriche algorithm is used to carry out this operation for which reference should be made to the publication Computer Vision, volume 1 pages 167-187 of April 1987 appearing under the title "Using Canny's criteria to derive a recursively implemented optimal edge detector".

An effort is then made, through a first series of transformations, to associate the graphic elements of the surface to be inspected with the identical graphic elements of the reference surface. This step makes it possible to avoid having to converge, by deformation, a graphic element of the reference surface representing a given pattern with a graphic element of the surface to be inspected representing a different pattern, which would lead to an aberration and in all probability to the impossibility of achieving a perfect match between the two graphic elements.

The choice of the method to be adopted to achieve this first series of transformations may quite simply consist in using the B-spline surfaces themselves provided that a certain number of precautions are taken.

Characteristic points associated with easily recognizable patterns of the surface to be inspected are located on the surface to be inspected. For example, it will be possible to use a conventional optical character recognition method better known as OCR (Optical Character Recognition) for the purpose of identifying and locating the alphanumeric characters and associated texts that are present on the surface.

After having located the alphanumeric characters, the texts or the patterns on the image of the reference surface and on the image of the surface to be inspected, the characters, texts or patterns that are present on the two surfaces are associated.

Figure 5:
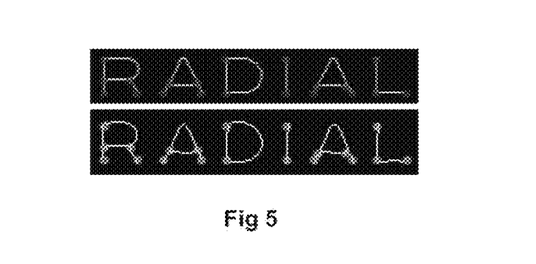
FIG. 5 illustrates the choice of characteristic points.

Thus, with reference to FIG. 5, the word "RADIAL" situated close to the bead on the reference image is associated with the word "RADIAL" situated in the same region of the image to be inspected.

A set of characteristic points present on each character or on each pattern is determined. These points are formed, as an example, by the intersection of the branches of the skeleton lines or else by the terminal points of the said branches. The locating of these points is precise as illustrated in FIG. 5 where the characteristic point associated with the bottom left corner of the L of "RADIAL" of the reference image is associated with the bottom left corner of the first L of "RADIAL" of the image to be inspected.

The characteristic points of the image of the reference surface and of the image of the surface to be inspected are then associated in twos to form couples of paired characteristic points.

The number of paired characteristic points is variable from one dimension to another and may also change between two successive analyses of one and the same tyre depending on possible anomalies that may be found on the relief markings, but also because of the successive rejections that may have been carried out at each of the steps of application of the optical character recognition method, which generates its own errors when the recognition criteria are not all fulfilled.

Figure 6:
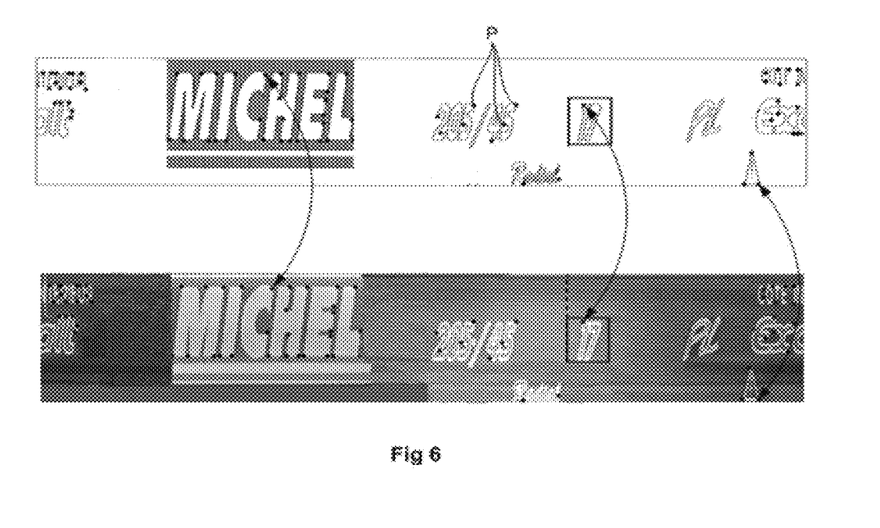
FIG. 6 illustrates the pairing of characteristic points.

Ideally, the pairs of characteristic points are distributed over the whole of the surface to be inspected, as shown in FIG. 6.

Then, a reset B-spline surface is associated with all of the characteristic points of the reference surface while considering that these characteristic points form a set of control points of the said reset B-spline surface. Each point of the reference surface is then parameterised as a linear combination of the position of the control points of the reset B-spline surface.

$P_c$ will designate all of the characteristic points serving as control points, and $p_c$ will be the set of parameters defining the positions of these control points in the coordinate system defining the position of the points of the reference surface.

The contours of the reference surface are then discretised by a regular sampling into a finite set $\Omega_c$ of points.

The position of each of these points is then defined as a linear combination of the position of the control points of the reset B-spline surface.

This set $\Omega_c$ of points being parameterised by the control points of the B-spline surface, $\Omega_c(p_c)$ designates the configuration taken by the points of $\Omega_c$ for the parameter set $p_c$. A modification of the positions of the control points of the B-spline surface (and hence of $p_c$) causes a deformation of the reference surface similar to that sustained by the B-spline surface that is associated therewith. This deformation is called a B-spline deformation of $\Omega_c$.

The next step therefore consists in deforming the reference surface by modifying the position of the control points of the reset B-spline surface corresponding to the characteristic points of the reference surface so as to superpose them on the characteristic points of the surface to be inspected that are paired with them.

This first transformation is relatively simple to implement but requires, as has already been said above, particular attention as to the choice of the control points. Specifically, it is important that the control points be sufficient in number and that they be distributed evenly over the surface, failing which there is a risk of incorrectly deforming the zones comprising a small number of control points.

And it is seen that these points are preferably situated in the area placed close to the bead, because of the large number of markings and of texts situated in this portion of the tyre. This preferable locating may lead to preferring a second transformation method in order to establish a match between the contours of the graphic elements of the surface to be inspected and the contours of the identical graphic elements of the reference surface.

The object of this method consists in determining a transformation function of which the set of starting points consists of the characteristic points of the reference surface, of which the determination is identical to that which has been explained above, and of which the ending set is formed by all of these points transformed by the said transformation function. With each of the points of this ending set it is possible to associate a magnitude representative of the distance separating it from the point of the surface to be inspected with which it is paired. The transformation function that minimises the total of these magnitudes is then sought by successive iterations. All of the points of the reference surface are then transformed with the aid of this transformation so as to establish the desired match.

According to a preferred mode of implementation of this method, the transformation function is an affine function which consists of the combination of a rotation, a movement and a deformation or a change of scale, of which the ratio has an absolute value different from 1 in a given direction, and a scaling on each of the coordinate axes. The centre of the change of scale usually consists of a point of the rotation axis of the tyre.

The image or object coordinates (x', y', 1) of a point (x, y, 1) of the reference image thus simplified are obtained based on the transformation which is expressed in the following vectorial form:

$$x' = H_{affine} x$$

$$\begin{pmatrix} x' \\ y' \\ 1 \end{pmatrix} = \begin{bmatrix} a_{11} & a_{12} & t_x \\ a_{21} & a_{22} & t_y \\ 0 & 0 & 1 \end{bmatrix} \begin{pmatrix} x \\ y \\ 1 \end{pmatrix}$$

and which can be rewritten in the following form:

$$p' = H_A p = \begin{bmatrix} A & t \\ 0^T & 1 \end{bmatrix} p$$

where t represents a translation in the plane, and A an affine matrix 2×2 which can be written in the form of a rotation and a stretching, or deformation, that is nonisotropic along two perpendicular axes forming a given angle relative to the axes of the rectangular coordinate system.

It is observed that the deformations found take place essentially in the radial direction and are relatively homogeneous over all of the circumference of the tyre, which makes it possible to make up for the low density of the characteristic points located in the top portion of the sidewall. Thus, the effects of possible local deformations due to anomalies remain minor.

It will also be noted that the use of an affine transformation to deform the reference surface as described above is a particular case of a deformation carried out by the movement of the control points of a B-spline surface that is parameterised as a consequence.

The value of using an affine transformation also lies in the fact that, when the said function has been determined, it can be applied to all of the tyres of the same dimension, and only the first or if necessary the second deformations, located on the graphic elements, must be recalculated for each of the tyres to be inspected. The advantage of this is again to limit the calculation times.

A third method making it possible to establish a correspondence between the contours of the graphic elements of the surface to be inspected and the contours of the reference surface consists in dividing the reference surface into surface elements of reduced size comprising one or more graphic elements then in establishing a coincidence between the contours of the graphic elements contained in the surface elements of reduced size of the reference surface and the contours of the graphic elements contained in the elements of reduced size of the surface to be inspected, preferably after having first carried out the simplification steps as explained above.

In order to achieve this, a cost function is determined making it possible to assess the distance between the contours of these two graphic elements and, by proceeding by iterative translations of the position of one element relative to the other, the position having the highest cost function is determined in order to assess the maximum correspondence between the two elements of the type:

$$P(f,g) = \frac{\sum_{i=1}^{i=I} \sum_{j=1}^{j=J} ((f_{ij} - \overline{f}) \times (g_{ij} - \overline{g}))}{\sqrt{\sum_{i=1}^{i=I} (f_{ij} - \overline{f})^2} \times \sqrt{\sum_{j=1}^{j=J} (g_{ij} - \overline{g})^2}}$$

However, this method, which is known and is cited here as a reminder, makes no provision for deforming the contours of the graphic elements and therefore does not make it possible to take full account of the sometimes considerable elastic deformations likely to show themselves on a surface element.

It will be observed at this stage that the implementation of one of the three transformation methods making it possible to establish a correspondence between the contours of the graphic elements of the reference surface and the identical contours of the graphic elements of the surface to be inspected can be carried out independently of the simplifications and the changes of coordinate systems described above. The calculation times will be increased by the same amount, in particular if it is chosen to remain in a three-dimensional space.

It will also be observed that the steps of flattening out, of rotation and of translation are themselves affine transformations which, by being combined with a first affine transformation, also give an affine transformation which it is possible to define directly by the proposed optimisation method, here again in return for a greater consumption of calculation time.

The following step of the inspection method according to the invention, the objective of which is to carry out a fine reset between the graphic elements of the reference surface and the graphic elements of the surface to be inspected, can be carried out after having established the said correspondence between the contours with the aid of any one of the methods explained above.

This step makes it possible to more precisely adjust the shape of a graphic element of the reference surface to the exact shape of this same graphic element contained in the surface to be inspected.

First, the reference surface is divided into elementary surfaces containing one or more graphic elements. The elementary surface may comprise a letter, a decorative pattern, or else a set of letters of reduced size.

An elementary B-spline surface is associated with each graphic element completely covering the said graphic element as illustrated in FIG. 6. This surface is parameterised by a control grid formed of N rows and of M columns defining N×M control points belonging to the reference surface. In general, the rows and the columns are distributed evenly. As an example, they form grids of reduced dimensions of 4×4 or 5×5 type when the graphic element is included in an elementary surface in the shape of a square.

Hereinafter, the same notations as those described above will be adopted, and P will designate all of the control points forming a first set of control points and p will be the parameter set defining the positions of these control points in the coordinate system defining the position of the points of the reference surface.

Figure 7:
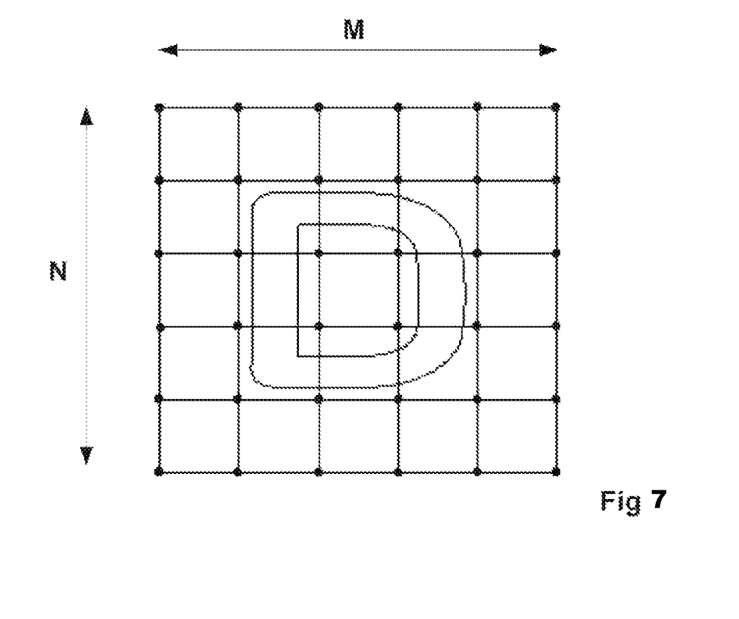
FIG. 7 illustrates an example of an elementary B-spline surface and of its control points.

The contours of the graphic element that are situated in the said elementary surface, in the instance illustrated in FIG. 7, the contours of the letter D, are then discretised by a regular sampling into a finite set $\Omega$ of points. To each of these points is added an item of orientation information of the contour at this point.

The position of each of these oriented points is then defined as a linear combination of the position of the control points of the B-spline surface. Similarly, the orientation of each of these points is expressed according to the position of the control points of the B-spline surface.

This set $\Omega$ of oriented points being parameterised by the control points of the B-spline surface, $\Omega(p)$ designates the configuration taken by the points of $\Omega$ for the parameter set p.

The next step consists in deforming the contour of each graphic element of the reference surface by modifying the position of the control points of the first set of control points of the elementary B-spline surface so as to minimise the distances between the contour of the graphic element of the reference surface and the contour corresponding thereto of the graphic element of the surface to be inspected.

Figure 8:
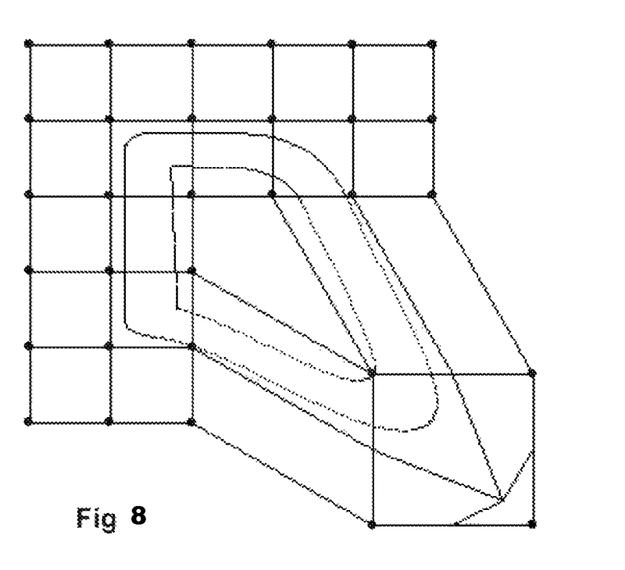
FIG. 8 illustrates the deformation of the contours of the graphic element contained in the elementary surface by modifying the position of the control points.

As illustrated in FIG. 8, a modification of the positions of the control points of the B-spline surface (and hence of p) causes a B-spline deformation (of $\Omega$) of the graphic element.

To carry out this optimisation effectively, it is wise to define, for each contour of a graphic element, a map of the distances in which the values of the pixels of the image represent the distance from this pixel to the closest pixel of the contour present in the image. This method is described by H. G. Barrow, J. M. Tenenbaum, R. C. Baum & H. C. Wolf in the article "Parametric correspondence and chamfer matching; two techniques for image matching" in Proc. Int. Joint Conf. Artificial Intelligence 977, p. 659-663. The value of this optimisation algorithm lies in its simplicity.

In order to gain in precision and robustness, specific constraints can be added in the construction of the map of the distances by using distance maps oriented in given directions. The distance taken into account then corresponds to the distance from the point to the closest contour, in a given direction corresponding substantially to the direction of the segment on which this point is situated. This method is described as an example by Clark F. Olson & Daniel P Huttenlocher in the article "Target Recognition by Matching Oriented Edge Pixels" IEEE, Transactions on Image Processing, Vol 6, No. 1 Jan. 1997. This trick is used to make the obtained results more reliable by "filtering" not very pertinent contours for the precise reset.

L indicates all of the control points of the elementary B-spline surface of which the position is free, that is to say of which the position can be modified by the optimisation algorithm of the reset. F indicates all of the control points of the elementary B-spline surface of which the position is fixed, that is to say of which the position cannot be modified by the optimisation algorithm of the reset.

The parameter set p is then divided into a parameter set l defining the position of the control points of L and a parameter set f defining the position of the control points of F. Hereinafter, the notation p(l,f) will be used to designate the value of the parameter set p at a given moment.

Furthermore, R will indicate all of the points of $\Omega$ of which the position is influenced by at least one control point belonging to L (a point A of $\Omega$ is influenced by a control point $P_{i,j}$ if the coefficient associated with $P_{i,j}$ in the linear combination defining the position of A is not zero). The notation R(p(l,f)) will be used to designate the configuration taken by the points of R for a B-spline deformation of parameter p(l,f).

The optimisation of the positions of the points belonging to L and F are initialised as follows:

L=P and F=Øps

Consequently: R=$\Omega$

Furthermore, a variable counting the number of iterations of the optimisation process is initialised at 0. This will make it possible to limit the number of iterations of the optimisation process.

The optimisation of the reset $\Omega(p(l,f))$ consists in finding the parameter set l for which the points of $\Omega(p(l,f))$ are projected closest to their real position in the acquisition.

In order to evaluate the current reset $\Omega(p(l,f))$, the following quality criterion is defined:

$$E(\Omega(p(l,f))=E_d(R(p(l,f)))+\lambda E_r(p(l,f))$$

where:

$E_d(R(p(l,f)))$: a term for tagging to the data. It measures the mean orthogonal distance from the points of R(p(l,f)) to the closest contour corresponding to them.

$E_r(p(l,f))$: a term of regularisation aiming to penalise the deformations that are not very realistic with respect to the nature of the sidewall. This term penalises the deformations having contractions/expansions that are too great or radii of curvature that are too large.

$\lambda$: a weighting factor used to adjust the influence of the term of regularisation.

With respect to the term for tagging to the data $E_d$, the reset error of a point of R(p(l,f)) is directly obtained by looking at the value of the pixel in the same position and with the same orientation in the previously calculated distance map.

With respect to the term of regularisation $E_r$, this is defined as follows:

$$E_r(p(l,f)) = \sum_{i=0}^{N-1}\left(\sum_{j=0}^{M}\left\|\begin{matrix}P_{i,j}(p(l,f))-\\P_{i+1,j}(p(l,f))\end{matrix}\right\| - \|P_{i,j}(p_{init})-P_{i+1,j}(p_{init})\|\right)^2 +$$

$$\sum_{i=0}^{N}\left(\sum_{j=0}^{M-1}\left\|\begin{matrix}P_{i,j}(p(l,f))-\\P_{1,j+1}(p(l,f))\end{matrix}\right\| - \|P_{i,j}(p_{init})-P_{i,j+1}(p_{init})\|\right)^2 +$$

$$\sum_{i=0}^{N-2}\left(\sum_{j=0}^{M}\left\|\begin{matrix}P_{i,j}(p(l,f))-\\P_{i+2,j}(p(l,f))\end{matrix}\right\| - \|P_{i,j}(p_{init})-P_{i+2,j}(p_{init})\|\right)^2 +$$

$$\sum_{i=0}^{N}\left(\sum_{j=0}^{M-2}\left\|\begin{matrix}P_{i,j}(p(l,f))-\\P_{1,j+2}(p(l,f))\end{matrix}\right\| - \|P_{i,j}(p_{init})-P_{i,j+2}(p_{init})\|\right)^2$$

where:

$P_{i,j}$ is the control point associated with the line i and with the column j of the control grid of the B-spline surface $p_{init}$: is the parameter set corresponding to the initial B-spline surface (i.e. not deformed).

Optimising the reset of Ω therefore consists in finding the parameter set l which minimises E(Ω,p(l,f)). This optimal parameter set l is estimated with the aid of a non-linear optimisation algorithm such as that of Levenberg-Marquardt of which the principles are described as an example in the publication by W.F. Press, S. A. Teukolsky, W. T. Vettering and B. P. Flannery in the volume: "Non linear Models" chapter 15.5 under the title: "Numerical Recipes in C".

After a non-linear optimisation iteration, the variable counting the number of iterations of the optimisation process is incremented by 1.

The iteration stops when the stop criterion is reached. For this, amongst the points of R, the set V of points of which the reset error after step B is greater than a fixed threshold δ is identified. This set V corresponds to all of the points of Ω for which the current reset quality is insufficient. If the set V is empty or if the number of iterations of the optimisation algorithm is too high, the optimisation process is interrupted. Otherwise, the iteration process is restarted until the stop criterion is triggered.

By successively deforming all the graphic elements of the reference surface, a reference surface that is finally reset relative to the surface to be inspected is obtained and it is possible to proceed to the control step which consists in superposing the two surfaces in order to draw therefrom the information useful for the quality of the tyre.

It may happen, however, that the deformation p(l,f) does not offer the desired reset quality and that it is then necessary to increase the number of degrees of freedom of the latter in order to allow a modelling of more complex deformations.

It is possible then to envisage a last step of fine adjustment which consists in subdividing the elementary B-spline surface deformed with the aid of the first set of control points and containing the graphic element, by increasing the number of control points so as to associate each graphic element of the reference surface originating from the first deformation with a subdivided B-spline surface formed with the aid of a third set of control points and concerning a particular detail of the contour of the graphic element.

For this, the elementary B-spline surface associated with the graphic element is subdivided with the aid for example of an algorithm of the Catmull-Clark type as described in the publication Computer-Aided design 10(6) pages 350-355 of November 1978 entitled "Recursively generated B-Splines surfaces on arbitrary topological surfaces". This subdivision increases the number of control points within a subdivision of the B-spline surface describing the graphic element without modifying the surface described. The deformation defined by this surface is therefore the same as that obtained after the previous step.

The B-spline surface associated with Ω is replaced by this new subdivided B-spline surface. The points of Ω are then expressed as surface points of the new subdivided B-spline surface. This means that the position/orientation of the points of Ω is expressed in the form of a linear combination of the positions of new control points of the second set of control points of the subdivided B-spline surface.

To reduce the calculation times, the elementary B-spline surface is subdivided around the only control points of the first set that influence a contour point of the first set of control points of the reference surface that was incorrectly reset after the first deformation, considering that, since the influence of a control point on the B-spline surface is local, only the control points influencing at least one incorrectly reset point of Ω (p(,l,f)) require being optimised.

This therefore gives as many second deformations as subdivided elementary surfaces.

The sets L and F are therefore updated in the following manner:
L=all the control points influencing at least one point of V.
F=P\L The set R is also updated based on the new definition of the sets L and F.

And the optimisation process is restarted as described in the previous paragraphs by applying it to the graphic element of the subdivided reference surface and by modifying the position of the second set of control points of the subdivided B-spline surface so as to minimise the distances between the contour of the subdivided graphic element of the reference surface and the corresponding contour of the graphic element of the surface to be inspected.

The deformation of the subdivided surface makes it possible to achieve a virtually perfect level of superposition of the contours of the reference surface and of the contours of the surface to be inspected. What this means is that the very precise superposition of the surfaces makes it possible to reduce the differences that are still possible between the two surfaces far below the thresholds of appearance of defects that it is sought to detect.

Each of the points of the reference surface is therefore transformed a first time with the aid of the first series of transformations, and a second time with the aid of a first or even a second deformation corresponding to the elementary surface or to the subdivided elementary surface.

Figure 9:
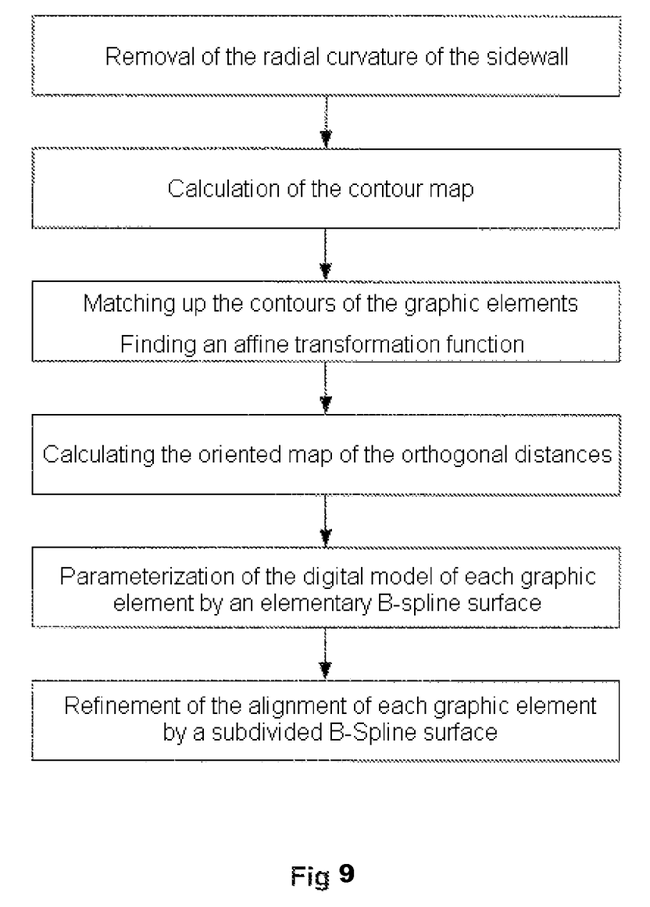
FIG. 9 is a diagram summarizing the main steps of the implementation of a method according to the invention.

The diagram of FIG. 9 lists the main steps of a preferred mode of implementing the invention.

Assessing the conformity of the surface to be inspected relative to the reference is not explicitly the subject of the present invention but it will be observed that the preparatory steps that consist in implementing the reset method according to the invention and as described in the foregoing paragraphs makes it possible to make a more pertinent analysis of the differences between the surface to be inspected and the reference surface. The result of this is a considerable reduction in the number of incorrect detections, and a better appreciation of the production anomalies in the portions of the surface that do not contain reliefs.

It goes without saying that the implementation of the inspection method according to the invention is associated with the use of computer means programmed for this purpose and capable of implementing the calculation algorithms comprising the steps in which:
the three-dimensional profile of the surface to be inspected is determined,
the contours of the graphic elements are extracted,
with the aid of a first series of transformations, a correspondence between the contours of the graphic elements of the surface to be inspected and the identical contours of the graphic elements of the reference surface is established,
an elementary B-spline surface comprising a second set of control points is associated with each graphic element of the transformed reference surface, and
a first deformation of the contour of each graphic element of the reference surface is carried out by modifying the position of the control points of the elementary B-spline surface so as to minimise the distances between the contour of the graphic element of the reference surface and the contour of the graphic element corresponding thereto of the surface to be inspected.

The invention claimed is:
1. A method for inspecting a portion of a surface of a tyre by comparison with an image of a three-dimensional refer- ence surface, the reference surface and the surface of the tyre including markings in relief, the method comprising steps of:

obtaining an image of a three-dimensional profile of a tyre surface to be inspected;

extracting, from the image of the three-dimensional profile of the tyre surface to be inspected, contours of graphic elements of the tyre surface to be inspected;

transforming the image of the reference surface using a first series of transformations to establish a correspondence between the contours of the graphic elements of the tyre surface to be inspected and contours of graphic elements of the reference surface;

after the transforming step, associating an elementary B-spline surface, which includes a first set of control points, with each graphic element of the transformed image of the reference surface; and, for each graphic element of the reference surface, carrying out a first deformation of the contour of the graphic element of the reference surface by modifying positions of corresponding control points of the first set of control points of the elementary B-spline surface so as to minimize a distance between the contour of the graphic element of the reference surface and a corresponding contour of a graphic element of the tyre surface to be inspected, wherein, after the first deformation of the contours of the graphic elements of the reference surface using the first set of control points of the elementary B-spline surface, the elementary B-spline surface is subdivided by increasing a number of control points so as to associate a second set of control points with each subdivided graphic element of the reference surface originating from the first deformation, and wherein the elementary B-spline surface is subdivided only around control points of the first set of control points having an influence on points of a contour of a graphic element of the reference surface that is incorrectly reset after the first deformation.

2. The method according to claim 1, wherein, prior to the transforming step, a radial profile of the tyre surface to be inspected and a radial profile of the reference surface is flattened out.

3. The method according to claim 1, wherein, prior to the transforming step, for the image of the tyre surface to be inspected and the image of the reference surface, polar coordinates expressed relative to a tyre rotation axis and polar coordinates of the reference surface are converted to Cartesian coordinates.

4. The method according to claim 2, wherein, prior to the transforming step, relief data relating to the image of the tyre surface to be inspected and the image of the reference surface is transformed to grey level data so as to produce a two-dimensional image of the tyre surface to be inspected and a two-dimensional image of the reference surface.

5. The method according to claim 1, wherein the transforming step includes:

locating characteristic points on the image of the tyre surface to be inspected and pairing the characteristic points with corresponding reference characteristic points of the image of the reference surface so as to create a set of paired points, associating a reset B-spline surface with the reference surface by assimilating the reference characteristic points of the image of the reference surface to control points of the reset B-spline surface, deforming the image of the reference surface by moving the control points of the reset B- spline surface so as to superpose the control points of the reset B-spline surface onto the characteristic points of the image of the tyre surface to be inspected paired with the corresponding reference characteristic points of the image of the reference surface.

6. The method according to claim 1, wherein the transforming step includes:

locating characteristic points on the image of the tyre surface to be inspected and pairing the characteristic points with corresponding reference characteristic points of the image of the reference surface so as to create a set of paired points, interatively applying an affine transformation function to the reference characteristic points of the image of the reference surface so that a value representing a total of distances between the reference characteristic points of the image of the reference surface, as transformed by the affine transformation function, and the characteristic points of the image of the tyre surface to be inspected, paired therewith, is minimal, transforming the reference characteristic points of the image of the reference surface using the affine transformation function.

7. The method according to claim 6, wherein the affine transformation function includes a change of scale of which a ratio has an absolute value different from 1.

8. The method according to claim 1, wherein the transforming step includes:

transforming three-dimensional data of the image of the reference surface using a scale factor in order to adjust a dimension of the image of the reference surface to a dimension of the image of the tyre surface to be inspected, dividing the image of the reference surface and the image of the tyre surface to be inspected into surface elements of reduced size that includes one or more graphic elements, establishing a coincidence between the one or more graphic elements included in the surface elements.

9. The method according to claim 1, further comprising a step of:

for each subdivided graphic element of the reference surface, carrying out a second deformation of the contour of the subdivided graphic element of the reference surface by modifying positions of control points of a subdivided B-spline surface so as to minimize distances between the contour of the subdivided graphic element of the reference surface and a corresponding contour of a graphic element of the tyre surface to be inspected.

10. The method according to claim 1, wherein a conformity of a zone of the tyre surface to be inspected is assessed by comparing digital data describing the tyre surface to be inspected with digital data describing the reference surface, modified using:

the first series of transformations, and at least one B-spline deformation.

11. An inspection apparatus for inspecting a surface of a tyre, the apparatus comprising:

a memory storing digital data describing a reference surface of a tyre;

a processor programmed to calculate algorithms of a program of a tyre inspection method, including:

extracting, from an image of a three-dimensional profile of a tyre surface to be inspected, contours of graphic elements of the tyre surface to be inspected, transforming an image of the reference surface using a first series of transformations to establish a correspondence between the contours of the graphic elements of the tyre surface to be inspected and contours of graphic elements of the reference surface, after the transforming, associating an elementary B-spline surface, which includes a first set of control points, with each graphic element of the transformed image of the reference surface, and, for each graphic element of the reference surface, carrying out a first deformation of the contour of the graphic element of the reference surface by modifying positions of corresponding control points of the first set of control points of the elementary B-spline surface so as to minimize a distance between the contour of the graphic element of the reference surface and a corresponding contour of a graphic element of the tyre surface to be inspected, wherein, after the first deformation of the contours of the graphic elements of the reference surface using the first set of control points of the elementary B-spline surface, the elementary B-spline surface is subdivided by increasing a number of control points so as to associate a second set of control points with each subdivided graphic element of the reference surface originating from the first deformation, and wherein the elementary B-spline surface is subdivided only around control points of the first set of control points having an influence on points of a contour of a graphic element of the reference surface that is incorrectly reset after the first deformation.

\* \* \* \* \*